(12) United States Patent
Kim et al.

(10) Patent No.: US 12,038,134 B2
(45) Date of Patent: Jul. 16, 2024

(54) KNOB CAP FOR HIGH-PRESSURE TANK

(71) Applicant: LOTTE CHEMICAL CORPORATION, Seoul (KR)

(72) Inventors: Dae Gun Kim, Daejeon (KR); Kyo Min Lee, Daejeon (KR); Young Koan Ko, Daejeon (KR); You Jung Lee, Daejeon (KR); Won Young Kim, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 157 days.

(21) Appl. No.: 17/777,701

(22) PCT Filed: Nov. 18, 2020

(86) PCT No.: PCT/KR2020/016247
§ 371 (c)(1),
(2) Date: May 18, 2022

(87) PCT Pub. No.: WO2021/101238
PCT Pub. Date: May 27, 2021

(65) Prior Publication Data
US 2022/0403984 A1    Dec. 22, 2022

(30) Foreign Application Priority Data

Nov. 19, 2019    (KR) .......................... 10-2019-0148483

(51) Int. Cl.
*F17C 13/06*    (2006.01)
*F17C 1/06*    (2006.01)

(52) U.S. Cl.
CPC ............... *F17C 13/06* (2013.01); *F17C 1/06* (2013.01); *F17C 2201/0109* (2013.01);
(Continued)

(58) Field of Classification Search
CPC .............. F17C 13/06; F17C 2205/0308; F17C 2205/0311; F17C 2209/2154;
(Continued)

(56) References Cited

U.S. PATENT DOCUMENTS

| 6,089,399 | A | * | 7/2000 | Felbaum | ............... | B32B 15/013 |
|   |   |   |   |   |   | 220/582 |
| 6,230,922 | B1 |   | 5/2001 | Rasche et al. |   |   |

(Continued)

FOREIGN PATENT DOCUMENTS

| CA | 2309948 A1 | 6/1999 |
| EP | 1029195 B1 | 8/2000 |

(Continued)

OTHER PUBLICATIONS

International Search Report in counterpart International Application No. PCT/KR2020/016247 dated Mar. 2, 2021, pp. 1-3.
(Continued)

*Primary Examiner* — Robert J Hicks
(74) *Attorney, Agent, or Firm* — Additon, Pendleton & Witherspoon, P.A.

(57) ABSTRACT

The present invention discloses a knob cap for a high-pressure tank including a first knob cap portion having a coupling groove coupled to a knob of a liner of the high-pressure tank in a lower surface, including a peripheral wing portion extending outward to be in contact with a surface of the liner to outside of a lower portion, and having a column portion in the shape of a column extending upward in a center; and a second knob cap portion integrally coupled with the first knob cap portion, having the column portion of the first knob cap portion inserted into a hollow, and including a plurality of inner grooves in the shape of a column having an upper end opened outside of the hollow and extending downward.

10 Claims, 9 Drawing Sheets

(52) U.S. Cl.
CPC ............. *F17C 2203/0604* (2013.01); *F17C 2203/066* (2013.01); *F17C 2205/0308* (2013.01); *F17C 2205/0323* (2013.01); *F17C 2221/012* (2013.01); *F17C 2221/033* (2013.01); *F17C 2221/035* (2013.01); *F17C 2223/035* (2013.01)

(58) Field of Classification Search
CPC ........ F17C 2223/035; F17C 2203/0663; F17C 2203/0665; F17C 2203/067; F17C 2203/0604; F17C 2203/0646
USPC .......... 220/582, 581, 203.01, 202, 200, 590, 220/589, 588, 586; 206/6
See application file for complete search history.

(56) References Cited

U.S. PATENT DOCUMENTS

| | | | | |
|---|---|---|---|---|
| 8,096,441 | B2* | 1/2012 | Sato | F17C 1/06 |
| | | | | 220/582 |
| 8,640,910 | B2 | 2/2014 | Novak et al. | |
| 2010/0294776 | A1 | 11/2010 | Liu | |
| 2011/0210516 | A1* | 9/2011 | Sharp | F17C 1/16 |
| | | | | 277/630 |
| 2016/0025266 | A1* | 1/2016 | Leavitt | F17C 1/16 |
| | | | | 206/0.6 |
| 2016/0053945 | A1 | 2/2016 | Levitt et al. | |
| 2016/0123532 | A1 | 5/2016 | Nakamura et al. | |
| 2016/0348845 | A1 | 12/2016 | Bowman et al. | |
| 2017/0276294 | A1* | 9/2017 | Almagro | F17C 1/06 |
| 2018/0202554 | A1 | 7/2018 | Hogan | |
| 2019/0152312 | A1 | 5/2019 | Park et al. | |

FOREIGN PATENT DOCUMENTS

| | | |
|---|---|---|
| JP | 07-158797 A | 6/1995 |
| JP | 08-219391 A | 8/1996 |
| JP | 10-332082 A | 12/1998 |
| JP | 2001-524653 A | 12/2001 |
| JP | 5985522 B2 | 9/2016 |
| JP | 2017-129153 A | 7/2017 |
| KR | 10-1731960 B1 | 5/2017 |
| WO | 2017/015536 A1 | 1/2017 |
| WO | 2021/101238 A1 | 5/2021 |

OTHER PUBLICATIONS

Extended Search Report in counterpart European Application No. 20888987.3 dated Oct. 31, 2023, pp. 1-7.

* cited by examiner under the patented KNOB CAP FOR HIGH-PRESSURE TANK

CROSS-REFERENCE TO RELATED APPLICATIONS

This application claims priority to and the benefit of International Application No. PCT/KR2020/016247, filed Nov. 18, 2020, which published as WO 2021/101238 on May 27, 2021, and Korean Patent Application No. 10-2019-0148483, filed in the Korean Intellectual Property Office on Nov. 19, 2019, the entire disclosure of each of which is incorporated herein by reference.

TECHNICAL FIELD

The present invention relates to a knob cap for a high-pressure tank, and relates to a knob cap for a high-pressure tank, which becomes a coupling part with a shaft when the high-pressure tank is manufactured by winding a composite material fiber on a surface of a liner by a filament winding technique.

BACKGROUND ART

A high-pressure tank storing high pressure gas such as hydrogen is installed in a vehicle using a gaseous fuel such as a natural gas vehicle or a hydrogen fuel cell vehicle. In particular, as a high-pressure tank storing high pressure hydrogen gas, a high-pressure tank corresponding to type 4 is used.

In general, the high-pressure tank of type 4 is manufactured by forming a composite material layer on a surface of a liner made of a plastic material by a filament winding technique. The liner is manufactured by combining a metal boss and a knob to a plastic material such as polyolefin-based resin or polyamide-based resin. The composite material layer is formed by winding a composite fiber in which a carbon fiber or a glass fiber is mixed with a polymer resin such as an epoxy resin on the surface of the liner.

In the case of a high-pressure tank of a one port type, a port that is a head boss to which a valve for an entry of gas such as hydrogen is coupled is formed on one side, and a knob that is a tail boss for the purpose of fixing the tank is formed on the other side. A method in which a metallic knob cap is externally coupled to the knob has been conventionally used.

The knob cap serves to be coupled to a fixing shaft and fix the tank in order to prevent the tank from shaking during a filament winding process. Since the entire knob cap is made of metal, the knob cap became a factor hindering a weight reduction of the high-pressure tank.

PRIOR TECHNICAL DOCUMENT

Patent Document (Patent Document 1) Japanese Patent Laid-Open Publication No. 1998-332082 (Dec. 15, 1998)

DISCLOSURE

Technical Problem

The present invention has been made in an effort to provide a knob cap for a high-pressure tank formed by combining a first knob cap portion and a second knob cap portion.

An exemplary embodiment of the present invention provides a knob cap for a high-pressure tank having advantages of installing a reinforcing cap having impact resistance so as to improve a protective effect against an external impact.

Technical Solution

Another embodiment of the present invention provides a knob cap for a high-pressure tank including a first knob cap portion having a coupling groove coupled to a knob of a liner of the high-pressure tank in a lower surface, including a peripheral wing portion extending outward to be in contact with a surface of the liner to outside of a lower portion, and having a column portion in the shape of a column extending upward in a center; and a second knob cap portion integrally coupled with the first knob cap portion, having the column portion of the first knob cap portion inserted into a hollow, and including a plurality of inner grooves in the shape of a column having an upper end opened outside of the hollow and extending downward.

According to an embodiment of the present invention, the first knob cap portion may be formed of a metal material, advantageously aluminum, and the second knob cap portion may be formed of a plastic material, advantageously a polyolefin-based resin, a composite material based on the polyolefin-based resin, or a fiber composite material containing a glass fiber or a carbon fiber in a combination of the resin.

According to an embodiment of the present invention, a reinforcing cap in the shape of a disk in which a coupling protrusion coupled to the inner groove is formed downward and a fixing hole communicatively connected with the hollow of the second knob cap portion is formed may be coupled to an upper portion of the second knob cap portion.

According to an embodiment of the present invention, a reinforcing material in the shape of a column may be inserted into the inner groove.

According to an embodiment of the present invention, the first knob cap portion may include an upper step surface formed outward in a lower end of the column portion because an outer circumferential surface is formed in step manner, a side surface formed on the upper step surface in a height direction, and a lower step surface extending outward from a lower end of the side surface, and the upper step surface, the side surface, and the lower step surface may be formed to be in contact with the second knob cap portion.

According to an embodiment of the present invention, the first knob cap portion may include a horizontal step surface extending outward from the lower end of the column portion, and the horizontal step surface and the lower surface of the second knob cap may be coupled to be in contact with each other.

According to an embodiment of the present invention, an undercut groove may be formed in at least a part of a surface of the first knob cap portion in contact with the second knob cap portion, and a protrusion portion figuratively coupled to the undercut groove may be formed in the second knob cap portion, and the first knob cap portion and the second knob cap portion may be physically coupled to each other through the undercut groove and the protrusion portion.

According to an embodiment of the present invention, an outer circumferential step may be formed in an outer circumferential surface of the second knob cap portion and may be formed on an upper end of the outer circumferential surface, and a composite material layer may be molded on the outer circumferential step when the high-pressure tank is manufactured.

Advantageous Effects

According to the knob cap for the high-pressure tank according to the present invention having the configuration as described above, it is possible to apply a plastic material to a part of the knob cap that is conventionally formed of a metal material, thereby achieving a weight reduction.

According to the present invention, it is possible to form the knob cap for the high-pressure tank in a hybrid structure of the first knob cap portion made of a metal material and the second knob cap portion made of a lightweight material, thereby reducing the weight of the knob cap by applying a weight reduction available material.

According to the present invention, it is possible to install the reinforcing cap having an impact resistance on the upper surface of the knob cap, thereby increasing the ability to respond to a drop test and an external impact.

MODE FOR INVENTION

Figure 1:
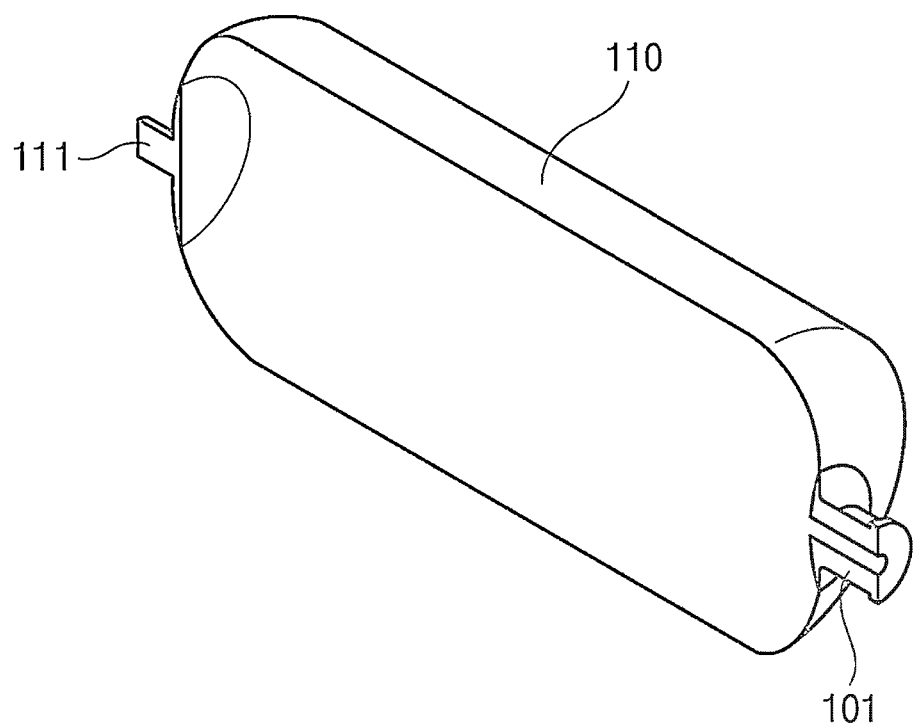
FIG. 1 is a diagram of a configuration of a liner to which a knob cap for a high-pressure tank is coupled according to the present invention.

Since the present invention may have various changes and may have various forms, embodiments will be described in detail in the detailed description. However, this is not intended to limit the present invention to the specific form of disclosure, it should be understood to include all modifications, equivalents and substitutes included in the spirit and scope of the present invention. In describing each of the drawings, like reference numerals have been used for like elements.

The above terms are used only for the purpose of distinguishing one element from another element. The terms used in the present application are only used to describe specific embodiments, and are not intended to limit the present invention. The singular expression includes the plural expression unless the context clearly dictates otherwise.

Hereinafter, an embodiment of the present invention will be described in detail with reference to the accompanying drawings.

FIG. 1 is a diagram of a configuration of a liner of a high-pressure tank according to the present invention. The high-pressure tank storing high-pressure gas such as hydrogen includes a liner 110 and a composite material layer 120 (see FIG. 3) formed by winding a fiber-reinforced composite material on an outer surface of the liner by a filament winding technique. The liner 110 stores high-pressure gas in an internal space and maintains tightness of the gas, and the composite material layer 120 serves to support a stress acting in a circumferential direction of the liner due to an internal pressure of the gas.

The liner 110 uses a plastic material such as polyolefin-based resin or polyamide-based resin for a weight reduction, and is manufactured through blow molding, rotational molding, or injection molding.

The composite material layer 120 is formed by wrapping a fiber-reinforced composite material in which a carbon fiber or a glass fiber is mixed with a polymer resin such as an epoxy resin on the surface of the liner 110, to maintain strength.

The high-pressure tank manufactured as described above is used for compressing and storing various fluids including liquefied petroleum gas (LPG), compressed natural gas (CNG), light hydrocarbons (methane, propane, and butane) and hydrogen gas.

A valve is coupled to one side of the liner 110 and a port 101 through which a gaseous fuel may enter and exit is formed therein, and a knob 111 for fixing purpose is provided on the other side. A knob cap 200 according to an embodiment of the present invention is coupled to the knob 111.

Figure 2:
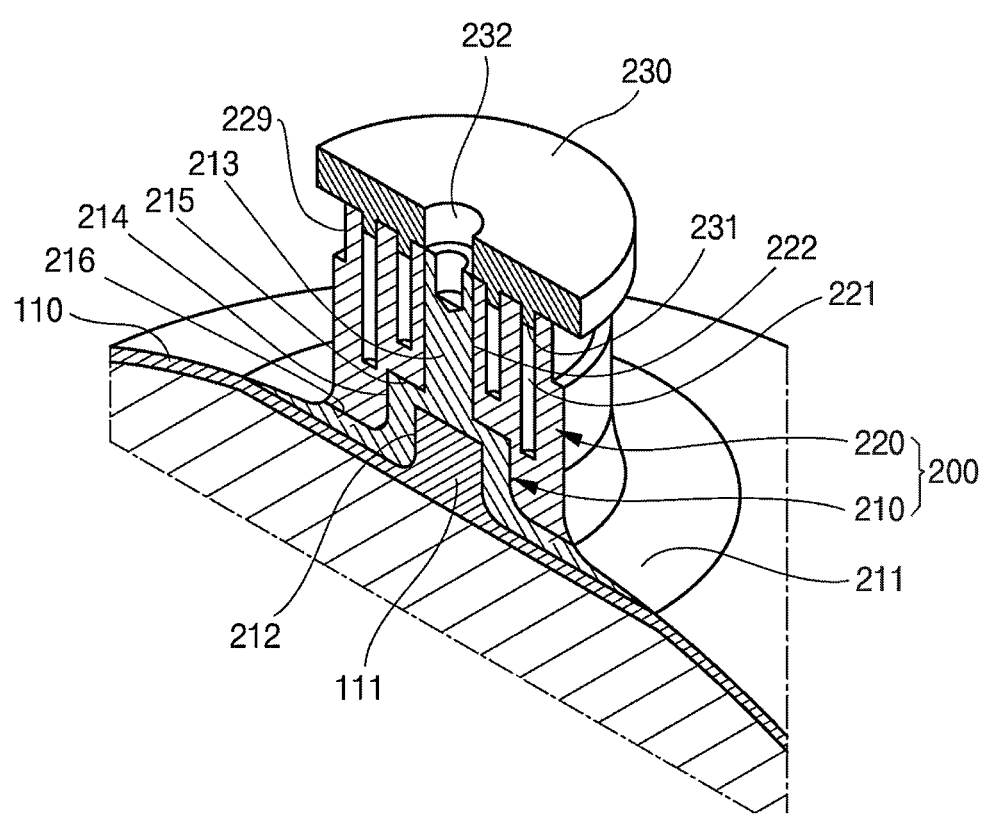
FIG. 2 is a cross-sectional perspective view illustrating a knob cap for a high-pressure tank according to a first embodiment of the present invention.
Figure 3:
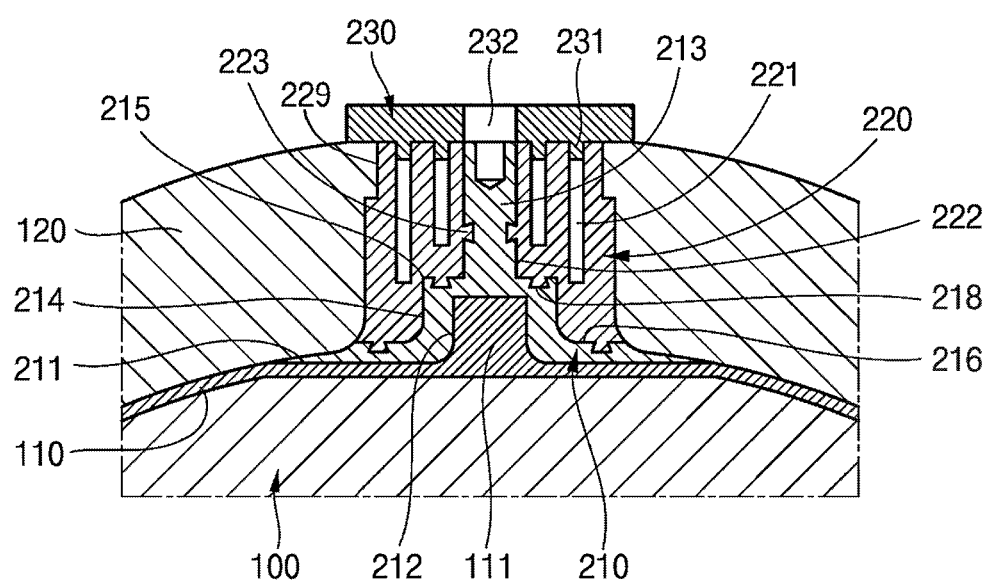
FIG. 3 is a front cross-sectional view of FIG. 2.
Figure 4:
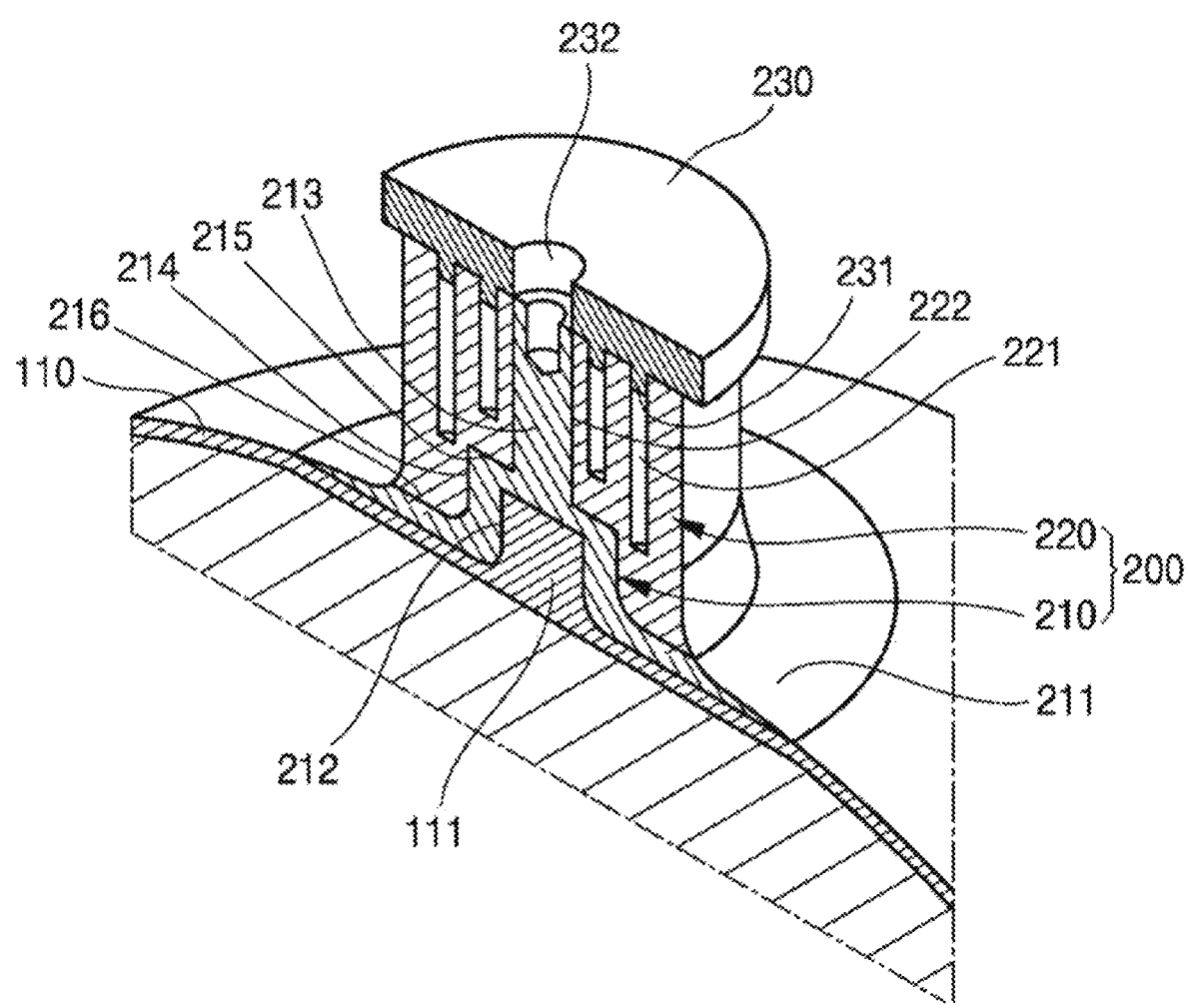
FIG. 4 is a cross-sectional perspective view illustrating a modification example of the knob cap for the high-pressure tank according to the first embodiment of the present invention.

FIGS. 2 to 4 are diagrams illustrating a knob cap for a high-pressure tank according to a first embodiment of the present invention.

In the first embodiment of the present invention shown in FIGS. 2 and 3, when compared with a modification example of the first embodiment of the present invention shown in FIG. 4, an outer circumferential step is additionally formed along a periphery of an outer circumferential surface of a second knob cap portion and the remaining configuration is the same.

Referring to FIGS. 2 to 4, the knob cap 200 according to the first embodiment of the present invention includes a first knob cap portion 210 and a second knob cap portion 220. The first knob cap portion 210 and the second knob cap portion 220 are integrally molded to form the knob cap 200. The knob cap 200 is coupled to the knob 111 formed on the other end of the liner 110 located inside the composite material layer 120 in the high-pressure tank 100.

The first knob cap portion 210 is formed of a metal material. It is advantageous that aluminum (Al) is used as the metal material.

A coupling groove 212 to which the knob 111 of the high-pressure tank liner 110 is coupled is formed in the center of a lower surface of the first knob cap portion 210, and a column portion 213 formed on the same axis as the coupling groove 212 on an upper side and moving upward is included.

According to an embodiment of the present invention, the coupling groove 212 may be formed as a nut-type groove having a screw thread on an inner circumferential surface.

Accordingly, the coupling groove 212 may be screw-coupled to the knob 111 having a screw thread formed on the outer circumferential surface.

According to the first embodiment of the present invention, the outer circumferential surface of the first knob cap portion 210 is formed in a step manner.

In the first knob cap portion 210, an upper step surface 215 enlarged in an outward direction from a lower end of the column portion 213 is formed, a lower step surface 216 is formed to a lower side, and a side surface 214 forming a height part between the upper step surface 215 and the lower step surface 216 is formed. According to the first embodiment of the present invention, the first knob cap portion 210 is integrally formed while the side surface 214 and the upper and lower step surfaces 215 and 216 are in contact with the second knob cap portion 220.

A peripheral wing portion 211 extending in an outward direction and in contact with the surface of the liner 110 is formed in an annular shape on the lower portion of the first knob cap portion 210. The entire bottom surface of the peripheral wing portion 211 is in close contact with the surface of the liner 110.

Since the peripheral wing portion 211 extending outward in the lower portion of the knob cap 200 is a part extending from the first knob cap portion 210, the peripheral wing portion 211 is formed of an aluminum material in the same way as the first knob cap portion 210. Thus, the peripheral wing portion 211 may resist pressure or impact.

The column portion 213 is formed on an upper side of the first knob cap portion 210. The column portion 213 extends upward in the center of the first knob cap portion 210. The column portion 213 is formed to have a smaller diameter or a smaller width than that of the upper surface of a body of the first knob cap portion 210. The column portion 213 may have a cylindrical or polygonal column shape.

The second knob cap portion 220 has a cylindrical shape having a hollow 222 in which the column portion 213 is inserted in the center, and is coupled to the upper portion of the first knob cap portion 210.

According to the first embodiment of the present invention, the outer circumferential surface of the first knob cap portion 210 is formed in a step manner, and the lower surface of the second knob cap portion 220 is formed in the form of a stepped groove having a contact surface corresponding to the upper step surface 215, the side surface 214, and the lower step surface 216.

When viewed as a whole, the knob cap 200 in which the first knob cap portion 210 and the second knob cap portion 220 are integrated includes an approximately cylindrical portion, and the peripheral wing portion 211 extending outward while continuing in a curve in a lower side of the cylindrical portion.

A reinforcing cap 230 to be described below may be coupled to the upper portion of the second knob cap portion 220.

A plurality of inner grooves 221 are formed in the second knob cap portion 220 and arranged to surround the hollow 222. The inner groove 221 is a groove in the shape of a column that extends downward from the upper surface of the second knob cap portion 220, that is, has the upper end opened and extending downward. The inner groove 221 may be formed in the form of a circular column, a polygonal column, etc. The inner grooves 221 are arranged in plurality spaced apart from each other at equal intervals in a circumferential direction, and spaced in a radial direction.

The inner groove 221 functions to prevent shrinkage from occurring during demolding from a mold after injection molding. That is, when the knob cap 200 is demolded from the mold after molding, shape deformation may occur as an amount of cooling shrinkage in the central portion is relatively increased, and the inner groove 221 functions to prevent the shape deformation due to the shrinkage.

According to the present invention, the inner groove 221 may be used as a reinforcing material mounting hole. That is, when physical properties deteriorate due to the inner groove 221, the physical properties may be reinforced by inserting a reinforcing material in a shape corresponding to the inner groove 221, that is, a column shape.

According to an embodiment of the present invention, the second knob cap portion 220 is formed of a fiber composite material. The second knob cap portion 220 is formed of polyolefin resin (HDPE series) or polyamide series (PA6, PA66, etc.) and a compound material based thereon or a fiber composite material (SFT, LFT, etc.) containing a fiber (a carbon fiber and a glass fiber) in a combination of the above resin, it is advantageous to first manufacture the first knob cap portion 210 of an aluminum material and then integrally form the second knob cap portion 220 through insert injection. When the knob cap 200 having the second knob cap portion 220 made of such a plastic material is applied to the knob 111 of the high-pressure tank 100, a weight of the high-pressure tank is reduced, which enables a weight reduction of the high-pressure tank.

According to the embodiment of the present invention, a physical shape coupling is formed by an undercut groove 218 and a protrusion portion 223 along the contact surface of the first knob cap portion 210 and the second knob cap portion 220. For better understanding and ease of description, the undercut groove 218 and the protrusion portion 223 are not shown in FIGS. 2 and 4, but shown in FIG. 3. Referring to FIG. 3, the undercut groove 218 in a ring shape is formed in at least one of an outer circumferential surface of the column portion 213 of the first knob cap portion 210, the upper step surface 215, and the lower step surface 216.

Therefore, during injection molding by inserting the first knob cap portion 210, the protrusion portion 223 corresponding to the undercut groove 218 is formed in the second knob cap portion 220, while the first knob cap portion 210 and the second knob cap portion 220 are physically integrally coupled to each other through the undercut groove 218 and the protrusion portion 223. Through this, in the first knob cap portion 210 and the second knob cap portion 220, a deterioration in a coupling force that may occur during insert injection molding of different materials is prevented.

Referring to FIGS. 2 and 3, an outer circumferential step 229 may be formed along the upper end of the outer circumferential surface of the second knob cap portion 220. As shown in FIG. 3, the composite material layer 120 is formed on the outer circumferential step 229 when the high-pressure tank 100 is formed. That is, the knob cap 200 and the composite material layer 120 are figuratively coupled through the outer circumferential step 229. Therefore, compared to the modification example of the first embodiment of the present invention shown in FIG. 4, it is more advantageous to inject an impact through the composite material layer 120 when the impact is applied from the outside. For better understanding and ease of description, the composite material layer 120 is not shown in FIGS. 2 and 4, but shown in FIG. 3.

The second knob cap portion 220 includes the reinforcing cap 230 that is coupled to the inner groove 221 and protects the high-pressure tank 100 from external pressure or impact to cover the upper portion of the second knob cap portion 220.

According to an embodiment of the present invention, the reinforcing cap 230 covering the upper surface of the knob cap 200 may be coupled to the knob cap 200 to the upper side of the second knob cap portion 220. A fixing groove may be formed in the center of the upper surface of the column portion 213.

The reinforcing cap 230 is in the shape of a thin disk with a fixing hole 232 formed in the center, and a plurality of coupling protrusions 231 correspondingly coupled to the inner groove 221 are formed downward on a lower surface. Although not shown in FIGS. 2 to 4, a fixing member having a lower end fastened to the fixing groove of the column portion 213 is inserted through the fixing hole 232 to fix the reinforcing cap 230 and the knob cap 200.

The reinforcing cap 230 may be formed of an expanded polypropylene (EPP) foam. As a result, the reinforcing cap 230 has an excellent recovery against repeated impact and deformation, maintains a high dimensional stability when exposed to an extreme temperature, and has an excellent impact resistance, a repeated buffering property, a flexibility and a chemical resistance.

Figure 5:
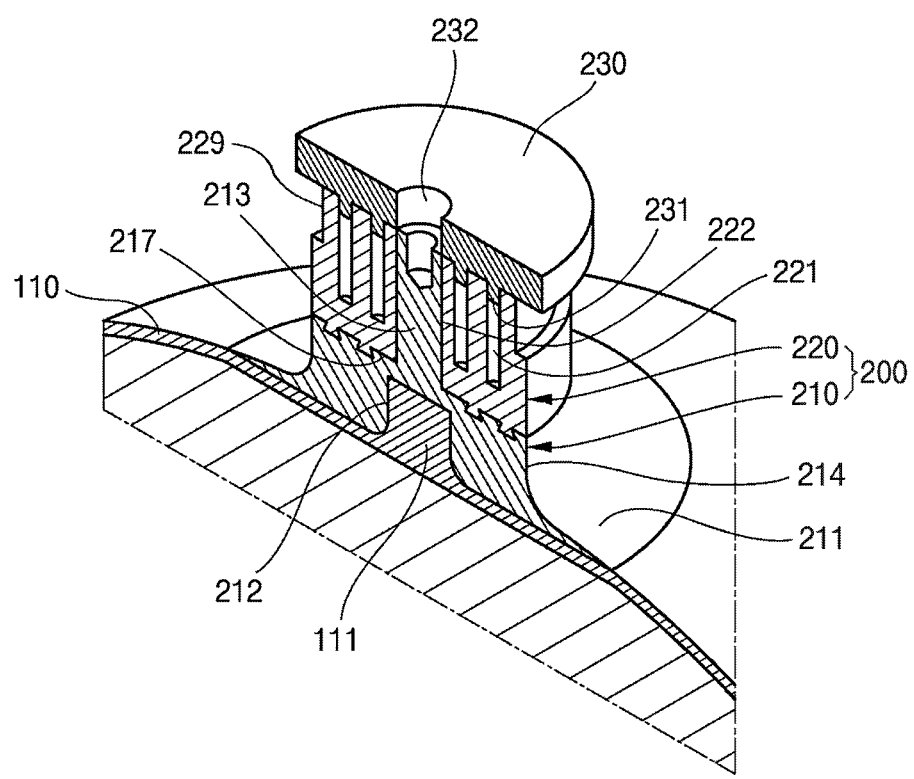
FIG. 5 is a cross-sectional perspective view illustrating a knob cap for a high-pressure tank according to a second embodiment of the present invention.
Figure 6:
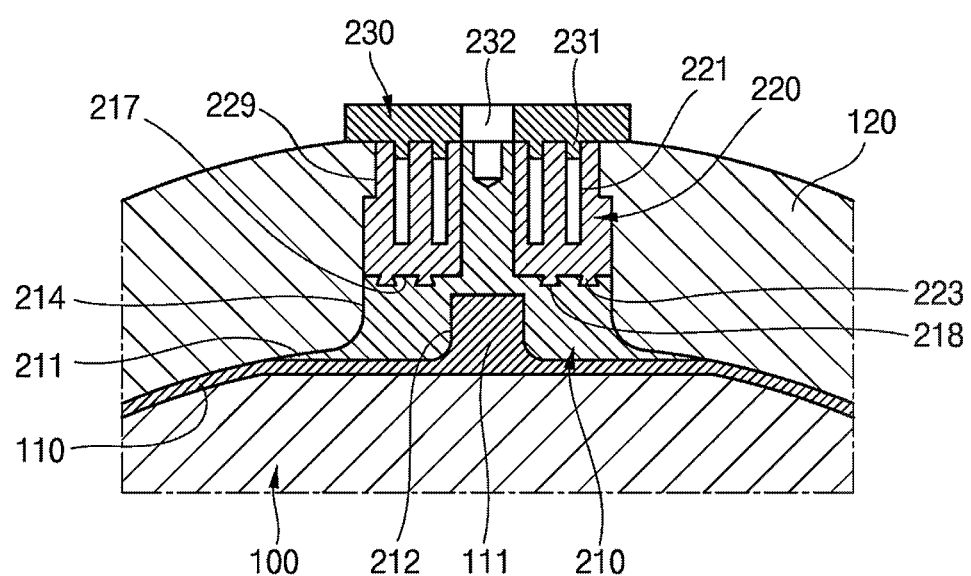
FIG. 6 is a front cross-sectional view of FIG. 5.
Figure 7:
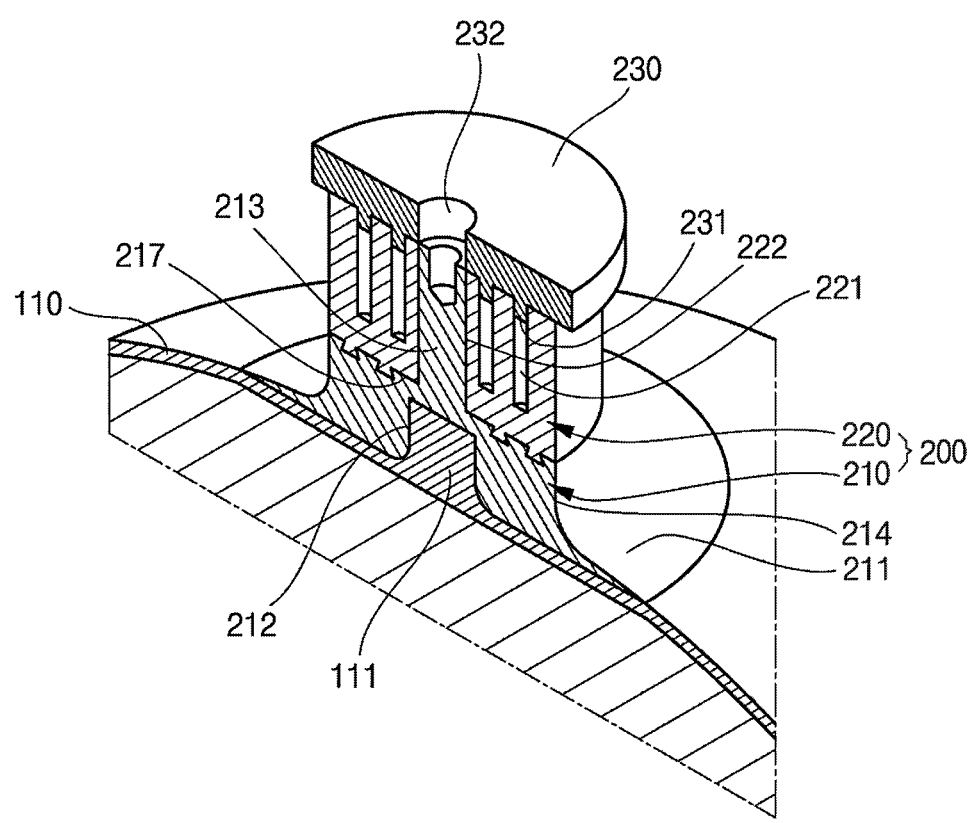
FIG. 7 is a cross-sectional perspective view illustrating a modification example of the knob cap for the high-pressure tank according to the second embodiment of the present invention.

FIGS. 5 to 7 are diagrams for explaining a knob cap for a high-pressure tank according to a second embodiment of the present invention.

Hereinafter, when describing the second embodiment of the knob cap for a high-pressure tank according to the present invention with reference to FIGS. 5 to 7, the same reference numerals are used for the components having the same configuration and the same functions as those of the first embodiment of the present invention. In order to avoid repeated descriptions, detailed descriptions of the same or similar configurations will be omitted. The second embodiment of the present invention shown in FIGS. 5 and 6 additionally includes an outer circumferential step formed on the outer circumferential surface of the second knob cap portion, compared to a modification example of the second embodiment of the present invention shown in FIG. 7, and the remaining configuration is the same. For better understanding and ease of description, the composite material layer 120 is not shown in FIGS. 5 and 7, but shown in FIG. 6.

As shown in FIGS. 5 to 7, the knob cap according to the second embodiment of the present invention includes the first knob cap portion 210 and the second knob cap portion 220 in the same manner as in the first embodiment. However, there are some differences in a shape.

The first knob cap portion 210 according to the second embodiment of the present invention includes the column portion 213 extending upward in the center, and a horizontal step surface 217 enlarged in an outward direction in a lower end of the column portion 213. Unlike the upper step surface 215 of the first embodiment of the present invention, the horizontal step surface 217 extends to the outer circumferential surface of the knob cap 200, and thus the side surface 214 of the first knob cap portion 210 does not come into contact with the lower surface of the second knob cap portion 220 and forms an outer circumferential surface continuously connected to the outer circumferential surface of the second knob cap portion 220.

The second knob cap portion 220 is integrally formed in contact with the first knob cap portion 210 on the horizontal step surface 217.

The peripheral wing portion 211 extends from the lower side of the side surface 214 of the first knob cap portion 210 outward to contact the surface of the liner 110.

The second knob cap portion 220 has a lower surface in contact with the horizontal step surface 217 and has a cylindrical shape having the hollow 222 into which the column portion 213 is inserted.

According to the second embodiment of the present invention, as in the first embodiment of the present invention, when viewed as a whole, the knob cap 200 has an approximately cylindrical portion, and the peripheral wing portion 211 extending outward while continuing in a curve in a lower side of the cylindrical portion.

According to the second embodiment of the present invention, the annular undercut groove 218 may be formed in at least one of the horizontal step surface 217 of the first knob cap portion 210 and the outer circumferential surface of the column portion 213, and during injection molding, the protrusion portion 223 is formed and is figuratively coupled to the undercut groove 218.

[Table 1] below is to explain a weight reduction rate in the knob cap (Embodiment 1) manufactured according to the first embodiment of the present invention, the knob cap (Embodiment 2) manufactured according to the second embodiment of the present invention and a known knob cap formed of aluminum as a comparative example. The overall shape and size of the knob cap are the same.

TABLE 1

|  | Embodiment 1 | Embodiment 2 | Comparative Example |
|---|---|---|---|
| material | Al + LFT | Al + LFT | Al |
| resin | PA 6 | PA 6 |  |
| fiber (content) | GF (50 wt %) | GF (50 wt %) |  |
| Weight (g) | 376 | 426 | 586 |
| weight reduction rate (%) | 35 | 27 | — |

In Embodiment 1 and Embodiment 2, the knob cap is a form in which the first knob cap portion made of an aluminum material and the second knob cap portion made of a long fiber thermoplastic (LFT) material are integrated through insert injection molding, and the knob cap of the comparative example is formed of an aluminum material.

In Embodiments 1 and 2 of the present invention, the resin and fiber contents in the LFT were formed to be the same.

In Embodiment 1 of the present invention, the volume of the aluminum material is 36% and the volume of the LFT material is 64%, and in Embodiment 2, the volume of the aluminum material is 50% and the volume of the LFT material is 50%. Upon comparing Embodiment 1 and Embodiment 2 of the present invention, a relatively higher weight reduction ratio may be achieved while the volume occupied by the LFT material is increased in Embodiment 1.

Figure 8:
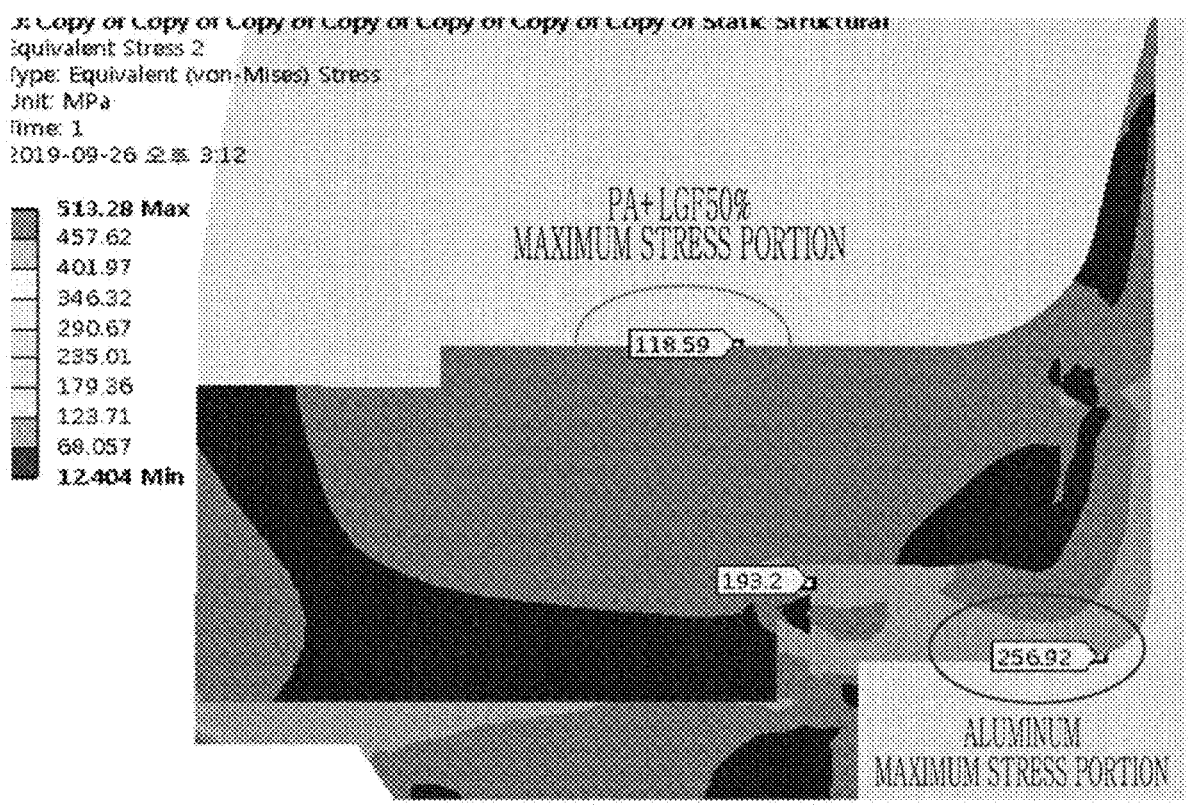
FIG. 8 is a diagram showing a stress distribution analysis result with respect to the knob cap for the high-pressure tank according to the first embodiment of the present invention.
Figure 9:
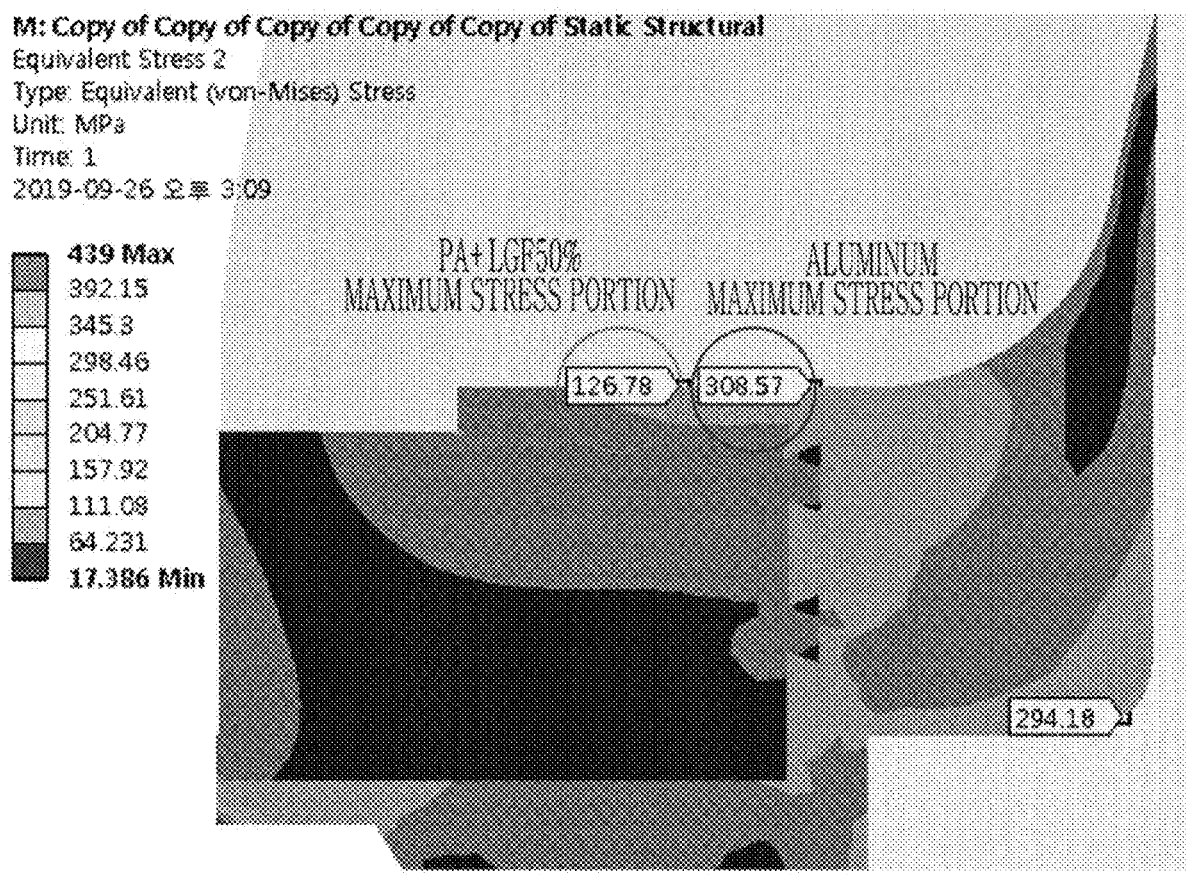
FIG. 9 is a diagram showing a stress distribution analysis result with respect to the knob cap for the high-pressure tank according to the second embodiment of the present invention.

FIGS. 8 and 9 are diagrams showing stress distribution analysis results with respect to the knob caps for a high-pressure tank according to the first and second embodiments of the present invention, in order to compare the effect of a structural stability between the first and second embodiments of the present invention.

As an experimental method, after molding a liner, the knob caps according to each embodiment of the present invention are applied to a knob of the liner, a composite material layer is formed by winding and molding a composite material by a filament winding technique, then is completely hardened, and whether the knob cap is deformed is analyzed at a minimum design bursting pressure (1,750 bar).

As shown in FIGS. 8 and 9, the knob cap according to the first embodiment of the present invention may secure a safety margin of +93% in the case of a LFT material and +21% in case of an aluminum material, so that the knob cap of the first embodiment has a more excellent structural stability than that of the second embodiment.

As in the embodiment of the present invention, when the heterogeneous injection molding knob cap 200 made of an aluminum metal material and an LFT plastic material is applied, a weight reduction effect of 27 to 35% may be obtained, which may act as a factor capable of increasing a weight efficiency of the high-pressure tank.

According to the present invention, it may be confirmed that the weight reduction and the reinforcement of physical properties of the high-pressure tank may be simultaneously obtained.

The above description of the present invention is for illustration, and one of ordinary skill in the art to which the present invention pertains may understand that the description may be easily modified into other specific forms without changing the technical spirit or essential features of the present invention. Therefore, it should be understood that the embodiments described above are illustrative in all respects and not restrictive. The scope of the present invention is indicated by the following claims, and all changes or modifications derived from the meaning and scope of the claims and their equivalent concepts should be construed as being included in the scope of the present invention.

EXPLANATION OF REFERENCE NUMERALS

- 100: high-pressure tank
- 101: port
- 110: liner
- 111: knob
- 120: composite material layer
- 200: knob cap
- 210: first knob cap portion
- 211: peripheral wing portion
- 212: coupling groove
- 213: column portion
- 214: side surface
- 215: upper step surface
- 216: lower step surface
- 217: horizontal step surface
- 218: undercut groove
- 220: second knob cap portion
- 221: inner groove
- 222: hollow
- 223: protrusion portion
- 229: outer circumferential step
- 230: reinforcing cap
- 231: coupling protrusion

The invention claimed is:

1. A knob cap for a high-pressure tank, the knob cap comprising:
   a first knob cap portion couplable to a knob of a liner of the high-pressure tank; and
   a second knob cap portion integrally coupled with the first knob cap portion,
   wherein the first knob cap portion includes:
   a coupling groove located at a lower surface of the first knob cap portion and couplable to the knob of the liner,
   a peripheral wing portion extending outward from a lower portion of the first knob cap portion and contacted with a surface of the liner, and
   a column portion formed in a shape of a column extending upward in the lower portion of the first knob cap portion, and wherein the second knob cap portion includes:
   a hollow into which the column portion of the first knob cap portion is inserted, and
   a plurality of inner grooves in the shape of a column located outside of the hollow and having an upper end opened and extending downward.

2. The knob cap of claim 1, wherein:
   a reinforcing cap in the shape of a disk in which a coupling protrusion coupled to the inner groove is formed downward and a fixing hole communicatively connected with the hollow of the second knob cap portion is formed is coupled to an upper portion of the second knob cap portion.

3. The knob cap of claim 1, wherein:
   a reinforcing material in the shape of a column is inserted into at least one of the plurality of the inner grooves.

4. The knob cap of claim 1, wherein:
   the first knob cap portion includes an upper step surface formed outward in a lower end of the column portion because an outer circumferential surface is formed in step manner, a side surface formed on the upper step surface in a height direction, and a lower step surface extending outward from a lower end of the side surface, and wherein the upper step surface, the side surface, and the lower step surface are in contact with the second knob cap portion.

5. The knob cap of claim 1, wherein:
   the first knob cap portion includes a horizontal step surface extending outward from a lower end of the column portion, and
   the horizontal step surface and a lower surface of the second knob cap are coupled to be in contact with each other.

6. The knob cap of claim 4, wherein:
   an undercut groove is formed in at least a part of a surface of the first knob cap portion in contact with the second knob cap portion, and a protrusion portion figuratively coupled to the undercut groove is formed in the second knob cap portion, and
   the first knob cap portion and the second knob cap portion are physically coupled to each other through the undercut groove and the protrusion portion.

7. The knob cap of claim 1, wherein:
   an outer circumferential step is formed in an outer circumferential surface of the second knob cap portion.

8. The knob cap of claim 5, wherein:
   an undercut groove is formed in at least a part of a surface of the first knob cap portion in contact with the second knob cap portion, and a protrusion portion figuratively coupled to the undercut groove is formed in the second knob cap portion, and
   the first knob cap portion and the second knob cap portion are physically coupled to each other through the undercut groove and the protrusion portion.

9. The knob cap of claim 1, wherein:
   the first knob cap portion and the second knob cap portion are formed from different materials to each other.

10. The knob cap of claim 1, wherein:
    the first knob cap portion is formed of a metal material, and
    the second knob cap portion is formed of a plastic material.

* * * * *